United States Patent
Teng et al.

(10) Patent No.: US 8,651,719 B2
(45) Date of Patent: Feb. 18, 2014

(54) LIGHT GUIDE DECORATIVE PLATE AND TOUCH LIGHT DECORATIVE PLATE

(75) Inventors: Li-Sheng Teng, New Taipei (TW);
Yao-Han Huang, New Taipei (TW);
Hish-Bin Dai, New Taipei (TW)

(73) Assignee: Wistron Corporation (TW)

( * ) Notice: Subject to any disclaimer, the term of this patent is extended or adjusted under 35 U.S.C. 154(b) by 0 days.

(21) Appl. No.: 13/483,281

(22) Filed: May 30, 2012

(65) Prior Publication Data

US 2013/0033889 A1   Feb. 7, 2013

(30) Foreign Application Priority Data

Aug. 3, 2011   (TW) .............................. 100127582 A

(51) Int. Cl.
*F21V 5/00* (2006.01)
*F21V 7/04* (2006.01)

(52) U.S. Cl.
USPC ............ 362/559; 362/551; 362/554; 362/560

(58) Field of Classification Search
None
See application file for complete search history.

(56) References Cited

U.S. PATENT DOCUMENTS

| | | | | |
|---|---|---|---|---|
| 6,445,866 | B1 * | 9/2002 | Clairadin et al. | 385/137 |
| 8,322,881 | B1 * | 12/2012 | Wassel | 362/247 |
| 8,353,602 | B2 * | 1/2013 | Van Herpen et al. | 362/153 |
| 8,444,288 | B1 * | 5/2013 | Leal | 362/157 |
| 2013/0155675 | A1 * | 6/2013 | Wassel | 362/235 |

FOREIGN PATENT DOCUMENTS

| | | |
|---|---|---|
| TW | 484520 | 4/2002 |
| TW | M263504 | 5/2005 |

OTHER PUBLICATIONS

Official Action issued on counterpart Taiwanese Patent Application No. 100127582 dated Oct. 17, 2013 with a copy of the English translation.

* cited by examiner

*Primary Examiner* — Natalie Walford
(74) *Attorney, Agent, or Firm* — Ostrolenk Faber LLP

(57) ABSTRACT

A light guide decorative plate includes a light permeable insulated decorative plate, and at least one optical fiber embedded in the light permeable insulated decorative plate. The optical fiber has one end exposed from the light permeable insulated decorative plate for guiding light emitted from a light source into the optical fiber, and another end opposite to said one end for exit of the light therethrough.
A touch light decorative plate is also disclosed.

13 Claims, 3 Drawing Sheets

LIGHT GUIDE DECORATIVE PLATE AND TOUCH LIGHT DECORATIVE PLATE

CROSS REFERENCE TO RELATED APPLICATION

This application claims priority of Taiwanese Patent Application No. 100127582, filed on Aug. 3, 2011, the disclosure of which is incorporated herein by reference.

BACKGROUND OF THE INVENTION

1. Field of the Invention

The invention relates to a light guide body, more particularly to a light guide decorative plate.

2. Description of the Related Art

Since optical fibers have good light guiding characteristics, they are widely used in various products for decorative purposes. Because optical fibers cannot endure heat, they melt when heated to a temperature exceeding 50° C. For this reason, it is not easy to directly connect the optical fibers to a product made by plastic injection molding. Hence, in a conventional optical fiber element, an optical fiber is first inserted into a pre-fabricated Teflon sleeve. Through the temperature-resistant characteristic of Teflon, the optical fiber element can then be connected to a plastic product during injection molding. However, since the optical fiber component is a single fiber structure, when a plurality of the optical fiber elements are connected to a surface of a plastic product to form a specific pattern, a specific mold must be used to fix the optical fiber elements so as to form the specific pattern before the injection molding process can be performed. This increases difficulty and complexity of the manufacturing process.

SUMMARY OF THE INVENTION

Therefore, an object of the present invention is to provide a light guide decorative plate and a touch light decorative plate that can endure heat and that can be easily connected with a plastic product.

According to one aspect of this invention, a light guide decorative plate comprises a light permeable insulated decorative plate, and at least one optical fiber embedded in the light permeable insulated decorative plate. The optical fiber has one end exposed from the light permeable insulated decorative plate for guiding light emitted from a light source into the optical fiber, and another end opposite to said one end for exit of the light therethrough.

Preferably, the light permeable insulated decorative plate is made of a low temperature curable material.

Preferably, the low temperature curable material is polyurethane or silicone rubber.

Preferably, a plurality of the optical fibers are embedded in the light permeable insulated decorative plate and are arranged to form a specific pattern. Said one ends of the optical fibers are gathered together and exposed from the light permeable insulated decorative plate.

Preferably, the light guide decorative plate further comprises a light permeable plastic casing covering an outer surface of the light permeable insulated decorative plate.

Preferably, the light permeable insulated decorative plate is resilient.

According to another aspect of this invention, a touch light decorative plate comprises a light permeable insulated decorative plate, a first light source disposed on one side of the light permeable insulated decorative plate, at least one optical fiber embedded in the light permeable insulated decorative plate, and a touch module. The optical fiber has one end exposed from the light permeable insulated decorative plate and corresponding in position to the first light source, and another end opposite to the one end. Light emitted from the first light source is guided into the optical fiber through the one end of the optical fiber, and exit through the another end of the optical fiber. The touch module includes a touch panel disposed on a surface of the light permeable insulated decorative plate, and a controller coupled electrically to the first light source and the touch panel. The controller controls activation and de-activation of the first light source in response to a touch signal outputted from the touch panel.

Preferably, the light guide decorative plate further comprises a light permeable plastic casing covering an outer surface of the light permeable insulated decorative plate. The touch panel is disposed on a surface of the light permeable plastic casing.

Preferably, the light permeable insulated decorative plate is made of a low temperature curable material. The low temperature curable material is polyurethane or silicone rubber, so that the light permeable insulated decorative plate can be cured to form a resilient body or a hardened structure under different conditions.

Preferably, a plurality of the optical fibers are embedded in the light permeable insulated decorative plate and are arranged to form a specific pattern. Said one ends of the optical fibers are gathered together and exposed from the light permeable insulated decorative plate.

Preferably, the touch light decorative plate further comprises a second light source disposed on said one side of the light permeable insulated decorative plate spaced apart from the first light source and coupled electrically to the controller. A plurality of the optical fibers are embedded in the light permeable insulated decorative plate and are divided into two groups. The two groups of the optical fibers are arranged to form two specific patterns at two different regions of the light permeable insulated decorative plate, respectively. Said one ends of the optical fibers of each group are gathered together and exposed from the light permeable insulated decorative plate at a position corresponding to a respective one of the first and second light sources. The touch panel includes two touch regions respectively controlling activation and de-activation of the first and second light sources. The controller controls activation and de-activation of the first and second light sources in response to touch signals outputted from the respective touch regions of the touch panel.

The advantage of this invention resides in that the present invention uses the light permeable insulated decorative plate embedded with the optical fiber to form a light guide plate, and the optical fibers can be pre-arranged to form a specific pattern in the light permeable insulated decorative plate. Further, by using the high temperature resistant light permeable insulated decorative plate as a medium (protective layer), the optical fiber can be connected to a plastic product under the high temperature environment of the injection molding. Hence, the object of the present invention can be achieved.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

The above-mentioned and other technical contents, features, and effects of this invention will be clearly presented from the following detailed description of an embodiment in coordination with the reference drawings.

Figure 1:
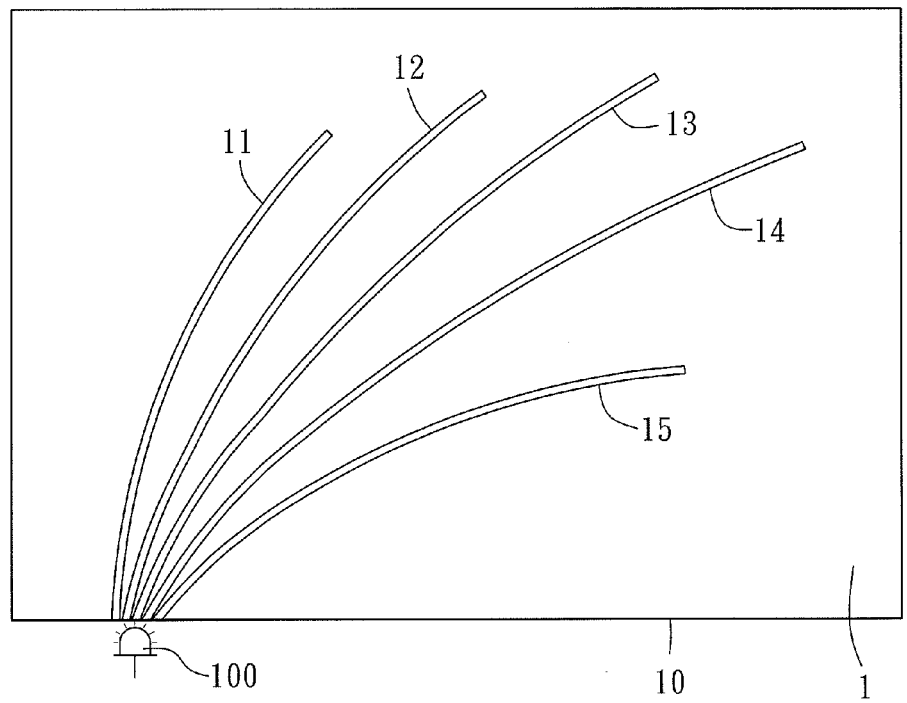
FIG. 1 is a schematic front view of an embodiment of a light guide decorative plate according to this invention.
Figure 2:
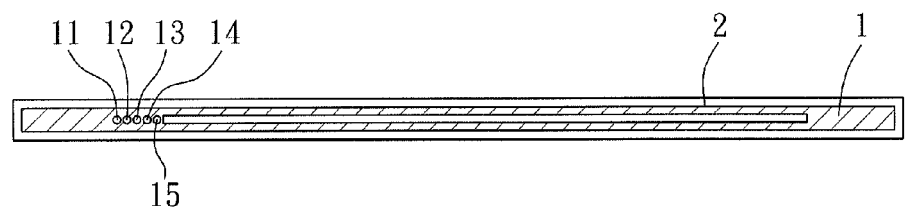
FIG. 2 is a sectional side view of the light guide decorative plate of FIG. 1.

Referring to FIGS. 1 and 2, a light guide decorative plate according to the embodiment of this invention is adapted to guide light emitted from a light source 100 thereinto, and includes a light permeable insulated decorative plate 1 and at least one optical fiber embedded in the light permeable insulated decorative plate 1. In this embodiment, five optical fibers 11~15 embedded in the light permeable insulated decorative plate 1 are exemplified. The light source 100 is disposed on one side 10 of the light permeable insulated decorative plate 1. The optical fibers 11~15 are arranged to form a specific pattern in the light permeable insulated decorative plate 1, and are gathered together at one end thereof. The gathered ends of the optical fibers 11~15 are exposed from the side 10 of the light permeable insulated decorative plate 1 at a position corresponding to the light source 100 for guiding the light emitted from the light source 100 into the optical fibers 11~15. The light exits through another opposite end of the optical fibers 11~15. Alternatively, the optical fibers 11~15 may be pre-formed with a plurality of holes (not shown) in their bodies so that the light traveling through the optical fibers 11~15 may leak out via the holes.

In this embodiment, the light permeable insulated decorative plate 1 is made of a low temperature curable material, such as polyurethane or silicone rubber. The optical fibers 11~15 are embedded into the light permeable insulated decorative plate 1 during the curing process thereof so that the optical fibers 11~15 may not be melted or damaged during the high temperature manufacturing process of the light permeable insulated decorative plate 1. Further, the light permeable insulated decorative plate 1 that uses polyurethane or silicone rubber in liquid form may form into a resilient body or a hardened structure after curing under different conditions. The light permeable insulated decorative plate 1 may be completely transparent or semi-transparent.

Moreover, as shown in FIG. 2, in this embodiment, a light permeable plastic casing 2 is formed on an outer surface of the light permeable insulated decorative plate 1 through an injection molding process so as to cover the same. Because the light permeable insulated decorative plate 1 can endure high heat during injection molding, it is used as a protective layer of the optical fibers 11~15, so that the optical fibers 11~15 may not be melted or damaged during the high temperature injection molding process.

Figure 3:
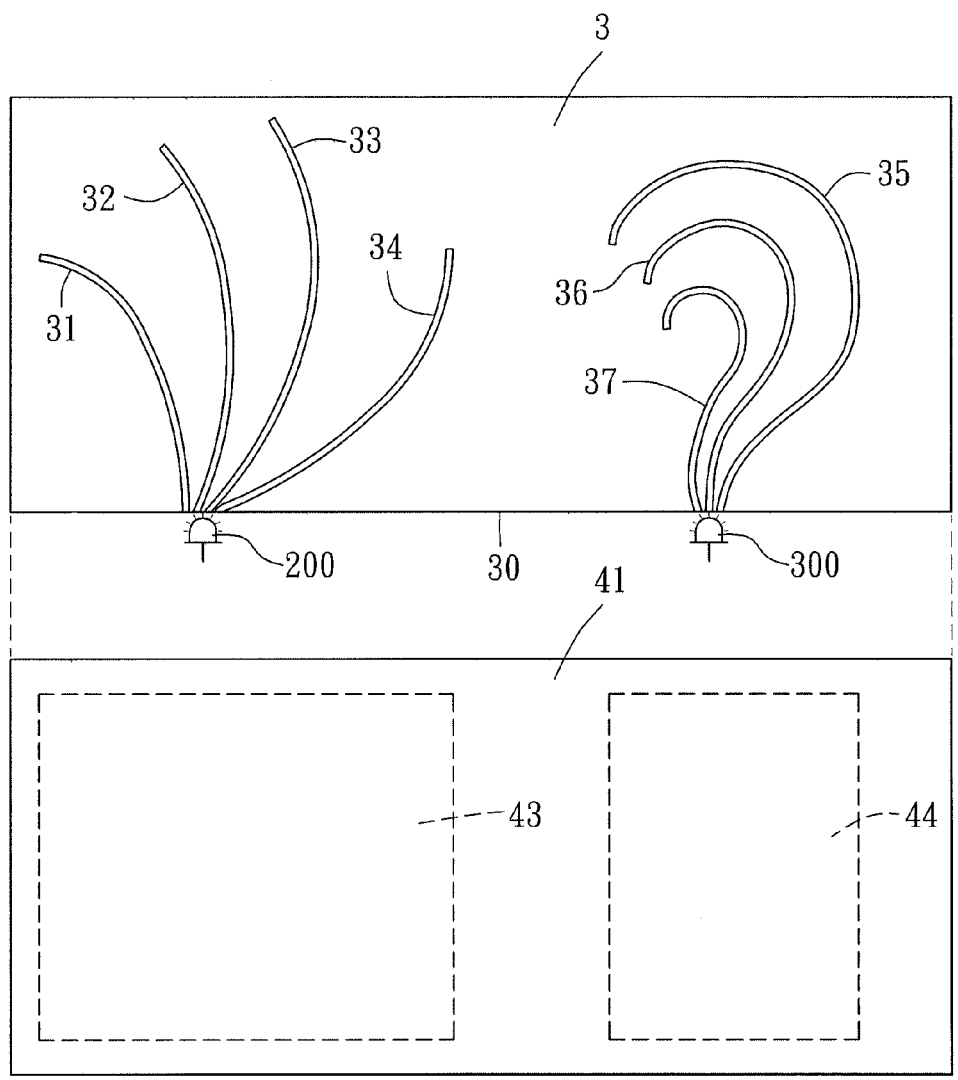
FIG. 3 is a schematic front view of an embodiment of a touch light decorative plate according to this invention.
Figure 4:
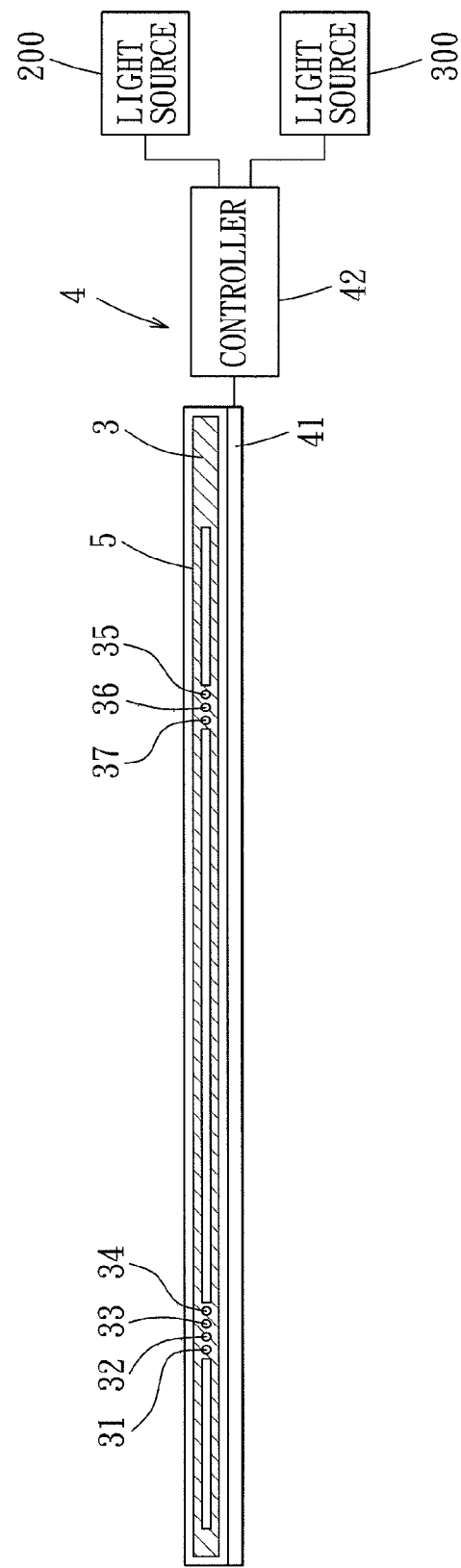
FIG. 4 is a sectional side view of the touch light decorative plate of FIG. 3.

Referring to FIGS. 3 and 4, a touch light decorative plate according to the embodiment of this invention is shown to comprise a light permeable insulated decorative plate 3, spaced-apart first and second light sources 200, 300 disposed on one side 30 of the light permeable insulated decorative plate 3, a plurality of optical fibers embedded in the light permeable insulated decorative plate 3, and a touch module 4. In this embodiment, seven optical fibers 31~37 embedded in the light permeable insulated decorative plate 3 are exemplified.

The light permeable insulated decorative plate 3 is similar to the light permeable insulated decorative plate 1. Particularly, the light permeable insulated decorative plate 3 is made of a low temperature curable material, such as polyurethane or silicone rubber. The optical fibers 31~37 are embedded into the light permeable insulated decorative plate 3 during the curing process thereof so that the optical fibers 31~37 may not be melted or damaged during the high temperature manufacturing process of the light permeable insulated decorative plate 3. Further, the light permeable insulated decorative plate 3 may form into a resilient body or a hardened structure after curing under different conditions. The light permeable insulated decorative plate 3 may be completely transparent or semi-transparent.

The optical fibers 31~37 in the light permeable insulated decorative plate 3 are divided into two groups, that is, the optical fibers 31~34 as one group and the optical fibers 35~37 as another group. The two groups of the optical fibers 31~37 are arranged to form two specific patterns at two different regions of the light permeable insulated decorative plate 3, respectively. The optical fibers 31~34 are gathered together at one end thereof. The gathered ends of the optical fibers 31~34 are exposed from the side 30 of the light permeable insulated decorative plate 3 at a position corresponding to the light source 200. The optical fibers 35~37 are gathered together at one end thereof. The gathered ends of the optical fibers 35~37 are exposed from the side 30 of the light permeable insulated decorative plate 3 at a position corresponding to the light source 300.

In this embodiment, a light permeable plastic casing 5 is formed on an outer surface of the light permeable insulated decorative plate 3 through an injection molding process so as to cover the same. Because the light permeable insulated decorative plate 3 can endure high heat during injection molding, it is used as a protective layer of the optical fibers 31~37, so that the optical fibers 31~37 may not be melted or damaged during the high temperature injection molding process. Hence, the optical fibers 31~37 can be connected to a plastic product through the light permeable insulated decorative plate 3.

The touch module 4 includes a touch panel 41 disposed on an outer surface of the light permeable plastic casing 5, and a controller 42 coupled electrically to the touch panel 41 and the first and second light sources 200, 300. The controller 42 controls activation or de-activation of the first and second light sources 200, 300 in response to a touch signal outputted from the touch panel 41. More accurately speaking, the touch panel includes two touch regions 43, 44 controlling activation and de-activation of the first and second light sources 200, 300, respectively. The touch regions 43, 44 correspond to the positions of the optical fibers 31~34 and the optical fibers 35~37, respectively. When the touch region 43 or 44 is touched, the controller 42 receives a touch signal outputted from the touch region 43 or 44 and controls activation of the corresponding first or second light source 200, 300. When the first or second light source 200, 300 is activated, light emitted therefrom travels through the corresponding optical fibers 31~34 or 35~37 so that the specific pattern of the optical fibers 31~34 or 35~37 is visible on the light permeable insulated decorative plate 3. The touch region 43 or 44 may be touched again so that the controller 42 can de-activate the corresponding first or second light source 200, 300.

In sum, the present invention uses the light permeable insulated decorative plate 1, 3 embedded with the optical fibers 11~15, 31~37 to form a light guide plate, and the optical fibers 11~15, 31~37 can be pre-arranged to form a specific pattern in the light permeable insulated decorative plate 1, 3. This assembly is simple as compared to that described in the aforesaid conventional optical fiber element that is inserted into the Teflon sleeve, which requires a mold to fix a plurality of the optical fiber elements so as to form a specific pattern prior to connection with a plastic product. Further, by using the high temperature resistant light permeable insulated decorative plate 1, 3 as a medium (protective layer), the optical fibers 11~15, 31~37 can be connected to a plastic product under the high temperature environment of the injection molding. Hence, the object of this invention can be achieved.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A light guide decorative plate comprising:
   a light permeable insulated decorative plate; and
   at least one optical fiber embedded in said light permeable insulated decorative plate, said optical fiber having one end exposed from said light permeable insulated decorative plate for guiding light emitted from a light source into said optical fiber, and another end opposite to said one end for exit of the light therethrough.

2. The light guide decorative plate of claim 1, wherein said light permeable insulated decorative plate is made of a low temperature curable material.

3. The light guide decorative plate of claim 2, wherein said low temperature curable material is polyurethane or silicone rubber.

4. The light guide decorative plate of claim 1, wherein a plurality of said optical fibers are embedded in said light permeable insulated decorative plate and are arranged to form a specific pattern, said one ends of said optical fibers being gathered together and exposed from said light permeable insulated decorative plate.

5. The light guide decorative plate of claim 1, further comprising a light permeable plastic casing covering an outer surface of said light permeable insulated decorative plate.

6. The light guide decorative plate of claim 1, wherein said light permeable insulated decorative plate is resilient.

7. A touch light decorative plate comprising:
   a light permeable insulated decorative plate;
   a first light source disposed on one side of said light permeable insulated decorative plate;
   at least one optical fiber embedded in said light permeable insulated decorative plate, said optical fiber having one end exposed from said light permeable insulated decorative plate and corresponding in position to said first light source, and another end opposite to said one end, light emitted from said first light source is guided into said optical fiber through said one end of said optical fiber, and exit through said another end of said optical fiber; and
   a touch module including a touch panel disposed on a surface of said light permeable insulated decorative plate, and a controller coupled electrically to said first light source and said touch panel, said controller controlling activation and de-activation of said first light source in response to a touch signal outputted from said touch panel.

8. The touch light decorative plate of claim 7, further comprising a light permeable plastic casing covering an outer surface of said light permeable insulated decorative plate, said touch panel being disposed on a surface of said light permeable plastic casing.

9. The touch light decorative plate of claim 7, wherein said light permeable insulated decorative plate is made of a low temperature curable material.

10. The touch light decorative plate of claim 9, wherein said low temperature curable material is polyurethane or silicone rubber.

11. The touch light decorative plate of claim 7, wherein a plurality of said optical fibers are embedded in said light permeable insulated decorative plate and are arranged to form a specific pattern, said one ends of said optical fibers being gathered together and exposed from said light permeable insulated decorative plate.

12. The touch light decorative plate of claim 7, further comprising a second light source disposed on said one side of said light permeable insulated decorative plate spaced apart from said first light source and coupled electrically to said controller, a plurality of said optical fibers being embedded in said light permeable insulated decorative plate and being divided into two groups, said two groups of said optical fibers being arranged to form two specific patterns at two different regions of said light permeable insulated decorative plate, respectively, said one ends of said optical fibers of each said group being gathered together and exposed from said light permeable insulated decorative plate at a position corresponding to a respective one of said first and second light sources, said touch panel including two touch regions respectively controlling activation and de-activation of said first and second light sources, said controller controlling activation and de-activation of said first and second light sources in response to touch signals outputted from respective said touch regions of said touch panel.

13. The touch light decorative plate of claim 7, wherein said light permeable insulated decorative plate is resilient.

* * * * *